(12) United States Patent
Maeda (10) Patent No.: US 9,927,688 B2
(45) Date of Patent: Mar. 27, 2018

(54) ILLUMINATION OPTICAL SYSTEM AND IMAGE PROJECTION APPARATUS

(71) Applicant: CANON KABUSHIKI KAISHA, Tokyo (JP)

(72) Inventor: Yuuki Maeda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 52 days.

(21) Appl. No.: 15/224,943

(22) Filed: Aug. 1, 2016

(65) Prior Publication Data

US 2017/0038666 A1 Feb. 9, 2017

(30) Foreign Application Priority Data

Aug. 6, 2015 (JP) .................... 2015-155645

(51) Int. Cl.
*G03B 21/20* (2006.01)
*G02B 27/28* (2006.01)
*G03B 21/00* (2006.01)

(52) U.S. Cl.
CPC ......... *G03B 21/208* (2013.01); *G02B 27/283* (2013.01); *G03B 21/006* (2013.01); *G03B 21/2073* (2013.01)

(58) Field of Classification Search
CPC .... G02B 27/283; G02B 13/00; G03B 21/006; G03B 21/2073; G03B 21/208; G03B 21/20; F21S 2/00; F21V 5/00; H04N 521/14

USPC ...................................... 353/102, 31; 359/51
See application file for complete search history.

(56) References Cited

U.S. PATENT DOCUMENTS 6,188,524 B1 * 2/2001 Hayashi ............... H04N 9/3105
348/E5.141

FOREIGN PATENT DOCUMENTS

JP          H08304739 A     11/1996

* cited by examiner

*Primary Examiner* — Steven H Whitesell Gordon
*Assistant Examiner* — Jerry Brooks
(74) *Attorney, Agent, or Firm* — Rossi, Kimms & McDowell LLP (57) ABSTRACT

The illumination optical system illuminates an illumination surface. The illumination optical system includes a first optical system configured to cause a light flux from a light source to form a light source image, and a second optical system configured to introduce the light flux from the first optical system to the illumination surface. The second optical system includes in order from a first optical system side, a first lens having a positive power, a second lens having a negative power, and a third lens having a positive power. The second optical system satisfies conditions of $0.20 \leq v2/v3 \leq 0.75$ and $0.4 \leq BF/Fall < 1.0$ where $v2$ represents an abbe number of the second lens, $v3$ represents an abbe number of the third lens, Fall represents a focal length of the second optical system, and BF represents an air-equivalent distance from the third lens to the illumination surface.

11 Claims, 4 Drawing Sheets

ILLUMINATION OPTICAL SYSTEM AND IMAGE PROJECTION APPARATUS

BACKGROUND OF THE INVENTION

Field of the Invention

The present invention relates to an illumination apparatus suitable for image projection apparatuses and others.

Description of the Related Art

Illumination optical systems used for image projection apparatuses such as liquid crystal projectors are required to have high light utilization efficiency and to be compact. Japanese Patent Laid-Open No. 8-304739 discloses an illumination optical system in which an integrator optical system forms multiple secondary light source images and a polarization conversion element that separates polarized light is disposed near a position where the secondary light source images are formed.

In conventional illumination optical systems, an illumination area is set to be larger than a liquid crystal element, in order to allow a displacement of the illumination area due to aberration, that is, an illumination margin area is provided. In order to increase the light utilization efficiency, the illumination margin area is desirable to be reduced.

However, the illumination optical system disclosed in Japanese Patent Laid-Open No. 8-304739 generates large chromatic aberration (especially, chromatic aberration of magnification) in the integrator optical system and therefore needs to increase the illumination margin area. This results in an increase of a light amount not used for the illumination of the liquid crystal panel, which decreases the light utilization efficiency.

SUMMARY OF THE INVENTION

The present invention provides a compact illumination optical system whose light utilization efficiency is high and provides an image projection apparatus using the illumination optical system.

The present invention provides as an aspect thereof an illumination optical system configured to illuminate an illumination surface. The illumination optical system includes a first optical system configured to cause a light flux from a light source to form a light source image, and a second optical system configured to introduce the light flux from the first optical system to the illumination surface. The second optical system includes in order from a first optical system side, a first lens having a positive power, a second lens having a negative power, and a third lens having a positive power. The second optical system satisfies the following conditions:

$$0.20 \leq v2/v3 \leq 0.75$$

$$0.4 \leq BF/\text{Fall} < 1.0$$

where $v2$ represents an abbe number of the second lens, $v3$ represents an abbe number of the third lens, Fall represents a focal length of the second optical system, and BF represents an air-equivalent distance from the third lens to the illumination surface.

When the first to third lenses are first to third lens units each including lenses, $v2$ represents an average abbe number of all the lenses included in the second lens unit, $v3$ represents an average abbe number of all the lenses included in the second lens unit, and BF represents an air-equivalent distance from the third lens unit to the illumination surface.

The present invention provides as another aspect thereof an image projection apparatus including the above illumination optical system, and a light modulator configured to modulate light from the illumination optical system.

Further features and aspects of the present invention will become apparent from the following description of exemplary embodiments with referring to the attached drawings.

DESCRIPTION OF THE EMBODIMENTS

Exemplary embodiments of the present invention will be described below with reference to the accompanied drawings.

Embodiment 1

Figure 1:
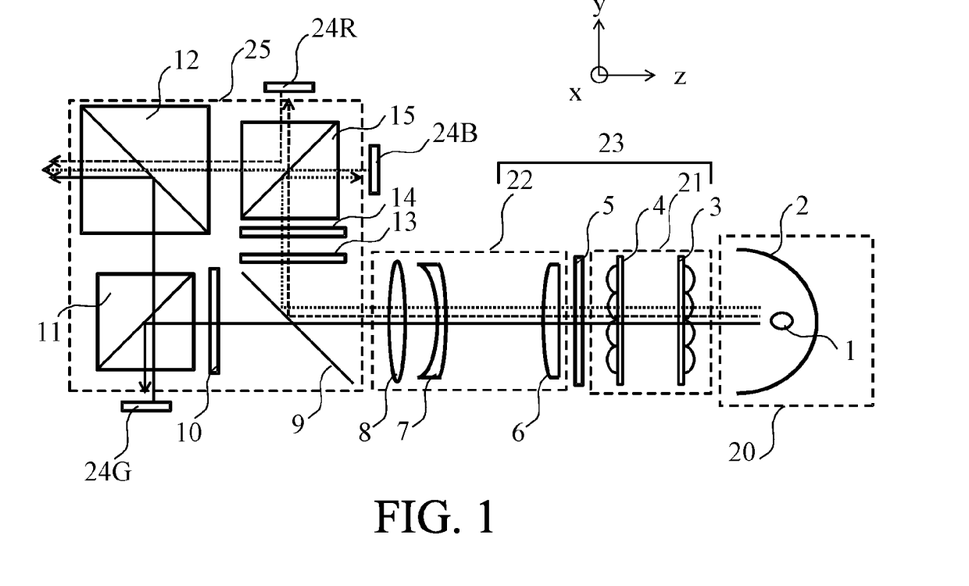
FIG. 1 is a sectional view illustrating an entire optical system of liquid crystal projectors that are Embodiments 1 to 4 of the present invention.

FIG. 1 illustrates a configuration of an entire optical system of a liquid crystal projector as an image projection apparatus that is a first embodiment (Embodiment 1) of the present invention.

The optical system of the projector is constituted by a light source unit 20, an illumination optical system 23, a color separation/combination optical system 25, liquid crystal panels 24R, 24G and 24B (hereinafter also collectively abbreviated as "a liquid crystal panel 24") as light modulators and a projection optical system (not illustrated).

The light source unit 20 includes a light source 1, such as an ultra-high pressure mercury lamp or a xenon lamp, and a reflector 2. As the light source unit 20, an LED and a laser may be used.

The illumination optical system 23 condenses a light flux from the light source unit 20 toward the liquid crystal panel 24. The illumination optical system 23 is a telecentric optical system in which a principal ray of the light flux proceeds parallel to an optical axis thereof.

The illumination optical system 23 includes a first optical system 21, a second optical system 22 and a polarization conversion element 5 disposed between the first and second optical systems 21 and 22.

The first optical system 21 includes a first fly-eye lens 3 and a second fly-eye lens 4. The second optical system 22 includes three lenses 6, 7 and 8.

The light flux entering the first optical system 21 from the light source unit 20 is divided by the first fly-eye lens 3 into multiple light fluxes, and the divided multiple light fluxes are condensed thereby. The multiple light fluxes transmitted through the second fly-eye lens 4 form multiple light source images. Near a position where the light source images, the polarization conversion element 5 is disposed.

Each of the multiple light fluxes entering the polarization conversion element 5 as a non-polarized light is converted thereby into a polarized light (an S-polarized light in this embodiment) and then enters the second optical system 22.

The multiple light fluxes entering the second optical system 22 are condensed toward the liquid crystal panel 24 by the three lenses 6 to 8 so as to overlap one another and enter the color separation/combination optical system 25.

The light (multiple light fluxes) entering the color separation/combination optical system 25 as a white light is separated by a dichroic mirror 9 into a green (G) light and a red and blue (RB) light. The G light as the S-polarized light is transmitted through a first polarizing plate 10 that transmits only an S-polarized light, enters a first polarization beam splitter 11 to be reflected by its polarization separation film and then enters the liquid crystal panel 24G for G. On the other hand, the RB light as the S-polarized light is transmitted through a second polarizing plate 13 that transmits only an S-polarized light and then enters a wavelength selective phase plate 14 where only a red (R) light is converted into a P-polarized light. The R light as the P-polarized light enters a second polarization beam splitter 15 to be transmitted through its polarization separation film and then enters the liquid crystal panel 24R for R. On the other hand, a B light transmitted through the wavelength selective phase plate 14 as the S-polarized light enters the second polarization beam splitter 15 to be reflected by its polarization separation film and then enters the liquid crystal panel 24B for B.

The liquid crystal panels 24R, 24G and 24B are each a reflective liquid crystal panel that reflects and image-modulates the entering light (R, G or B light).

The G light modulated by the liquid crystal element 24G and thereby becoming a P-polarized light is transmitted through the polarization separation film of the first polarization beam splitter 11 and then enters a color combination prism 12 to be reflected by its dichroic surface. The R light modulated by the liquid crystal element 24R and thereby becoming an S-polarized light is reflected by the polarization separation film of the second polarization beam splitter 15 and then enters the color combination prism 12 to be transmitted through its dichroic surface. The B light modulated by the liquid crystal element 24B and thereby becoming a P-polarized light is transmitted through the polarization separation film of the second polarization beam splitter 15 and then enters the color combination prism 12 to be transmitted through its dichroic surface.

The combined light (R, G and B lights) enters the projection optical system to be projected thereby onto the projection surface such as a screen, which displays a color projected image.

Figure 2:
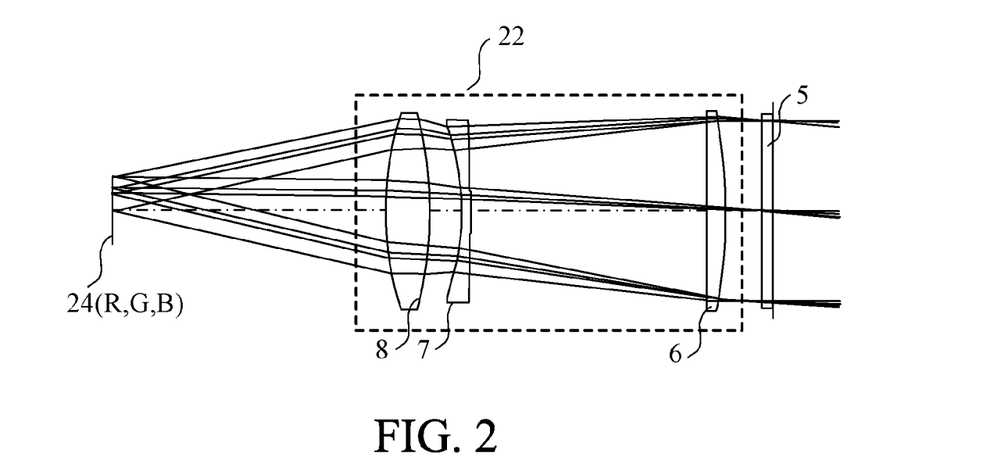
FIG. 2 is a sectional view of a condenser optical system in Embodiment 1.

Next, detailed description will be made of the second optical system 22 of the illumination optical system 23. The second optical system 22 includes, in order from a first optical system side (polarization conversion element side), a first lens 6 having a positive power, a second lens 7 having a negative power and a third lens 8 having a positive power. The second lens 7 is a meniscus lens convex toward the first optical system side.

In the following description, f1, N1 and ν1 respectively represent a focal length, a refractive index and an abbe number of the first lens 6, and f2, N2 and ν2 respectively represent a focal length, a refractive index and an abbe number of the second lens 7. Similarly, f3, N3 and ν3 respectively represent a focal length, a refractive index and an abbe number of the third lens 8. The refractive indicies N1, N2 and N3 and the abbe numbers ν1, ν2 and ν3 are each a value for a d-line. Furthermore, Fall represents a focal length of the entire second optical system 22, D12 represents an air-equivalent distance from the first len 6 to the second lens 7, and BF represents an air-equivalent distance from the third lens 8 to the liquid crystal panel 24 disposed at an llumination surface.

Under these definitions, the second optical system 22 satisfies conditions expressed by following expressions (1) and (2), which enables sufficiently correcting aberration.

$$0.20 \leq \nu 2/\nu 3 \leq 0.75 \quad (1)$$

$$0.4 \leq BF/\text{Fall} < 1.0 \quad (2)$$

The first to third lenses may be first to third lens units each including lenses. In this case, ν2 represents an average abbe number of all the lenses included in the second lens unit, ν3 represents an average abbe number of all the lenses included in the second lens unit, and BF represents an air-equivalent distance from the third lens unit to the illumination surface.

The condition of expression (1) relates to a relation of dispersions of the second and third lenses 7 and 8. A larger value of ν2/ν3 than the upper limit of expression (1) decreases an achromatic effect and thereby generates chromatic aberration (especially, chromatic aberration of magnification). On the other hand, a combination of materials making the value of ν2/ν3 lower than the lower limit of expression (1) requires selecting as a material of the third lens 8 a glass material whose abbe number is extremely high, which is not realistic from a viewpoint of cost. It is more desirable to change the range of the condition of expression (1) as below.

$$0.30 \leq \nu 2/\nu 3 \leq 0.65 \quad (1)'$$

The condition of expression (2) relates to a relation of the distance between the third lens 8 and the liquid crystal panel 24 and the focal length of the second optical system 22. A lower value of BF/Fall than the lower limit of expression (2) makes it impossible to dispose other optical elements (such as the color separation/combination optical system 25) between the third lens 8 and the liquid crystal panel 24 unless increasing the focal length Fall of the second optical system 22. On the other hand, an increased focal length Fall of the second optical system 22 increases an entire length thereof, which results in an increase in size of the entire illumination optical system 23. The value of BF/Fall is never larger than the upper limit of expression (2). It is more desirable to change the range of the condition of expression (2) as below.

$$0.60 \leq BF/\text{Fall} \leq 0.85 \quad (2)'$$

When D23 represents an air-equivalent distance between the second and third lenses 7 and 8, it is desirable to satisfy a condition expressed by following expression (3).

$$0.0 \leq D23/\text{Fall} \leq 0.2 \quad (3)$$

The condition of expression (3) relates to a relation of the distance between the second and third lenses 7 and 8 and the focal length of the second optical system 22. A higher value of D23/Fall than the upper limit of expression (3) makes heights (distances from the optical axis) at which an identical ray passes through the second lens 7 and the third lens 8 significantly different from each other, which undesirably makes aberration correction difficult. The value of D23/Fall is equal to the lower limit of expression (3) when the second and third lenses 7 and 8 are in contact with each other, that is, when the second and third lenses 7 and 8 are formed as a cemented lens. It is more desirable to change the range of the condition of expression (3) as below.

$$0.05 < D23/\text{Fall} \leq 0.15 \quad (3)'$$

Furthermore, it is desirable to satisfy a condition expressed by following expression (4).

$$0.5 \leq |f2|/|\text{Fall}| \leq 1.3 \quad (4)$$

The condition of expression (4) relates to the focal lengths of the second lens 7 and the second optical system 22. A higher value of $|f2|/|\text{Fall}|$ than the upper limit of expression (4) makes it impossible to increase the power of the first lens 6, which undesirably makes it impossible to reduce the second optical system 22 in size. On the other hand, a lower value of $|f2|/|\text{Fall}|$ than the lower limit of expression (4) excessively increases the power of the second lens 7, which undesirably significantly increases aberration. It is more desirable to change the range of the condition of expression (4) as below.

$$0.6 \leq |f2|/|\text{Fall}| \leq 1.1 \quad (4)'$$

Moreover, it is desirable to satisfy a condition expressed by expression (5), which is a condition for an effective achromatization.

$$15 < v2 < 45 \quad (5)$$

A higher value of v2 than the upper limit of expression (5) makes it necessary to select as the material of the third lens 8 a glass material whose abbe number is extremely high, which undesirably makes it difficult to select the material of the third lens 8. On the other hand, a lower value of v2 than the lower limit of expression (5) significantly increases a light absoptance of a glass material of the second lens 7, which undesirably decreases light utilization efficiency of the illumination optical system 23. It is more desirable to change the range of the condition of expression (5) as below.

$$18 < v2 < 35 \quad (5)'$$

In addition, it is desirable to satisfy conditions expressed by expressions (6) and (7), which are conditions for a further effective aberration correction.

$$1.55 < N2 < 2.00 \quad (6)$$

$$1.55 < N3 < 1.90 \quad (7)$$

A lower value of N2 than the lower limit of expression (6) and a lower value of N3 than the lower limit of expression (7) respectively excessively reduce curvature radii of the second lens 7 and the third lens 8, which undesirably significantly increases aberration and decreases the light utilization efficiency. On the other hand, glass materials whose values of N2 and N3 are higher than the upper limits of expressions (6) and (7) are likely to have a high light absorptance, which undesirably decreases illumination efficiency. It is more desirable to change the ranges of the conditions of expressions (6) and (7) as below.

$$1.65 < N2 < 1.90 \quad (6)'$$

$$1.65 < N3 < 1.85 \quad (7)'$$

It is further desirable that an air-equivalent distance from the first lens 6 to the second lens 7 be longer than five times that from the second lens 7 to the third lens 8. In addition, it is further desirable that the second lens 7 be, as in this embodiment, a meniscus lens convex toward the first optical system side or the second lens 7 be a planar-concave lens whose first optical system side surface is a planar surface.

Although this embodiment described the case of using the three liquid crystal panels 24R, 24G and 24B for the three color (R, G and B) lights, a single liquid crystal panel may be used by time-division.

Furthermore, although this embodiment described the case of using the first optical system 21 including the first and second fly-eye lenses 3 and 4, a rod integrator may be used as the first optical system.

In this case, an optical system disposed between a light source image formed by light exiting from the rod integrator and a light modulator (such as a digital micromirror device) corresponds to the second optical system. When the digital micromirror device is used, the polarization conversion element 5 is not used.

Next, description will be made of a numerical example (Numerical Example 1) of the second optical system 22 in this embodiment.

In Table 1, a numeral in the left column represents an ordinal number of a lens surface counted from the first optical system side, R represents a curvature radius (unit: mm) of that lens surface, and D represents a lens thickness or an air-equivalent distance (unit: mm) between that lens surface and a next lens surface. Moreover, N and v respectively represent a refractive index and an Abbe number of a material of a lens having that lens surface for the d-line. Below Table 1, numerical values of expressions (1) to (7) are listed.

TABLE 1

| (Numerical Example 1) | | | |
|---|---|---|---|
| R | D | N | v |
| 1 | 118.73 | 5.50 | 1.5163 | 64.14 |
| 2 | ∞ | 67.70 | | |
| 3 | 278.73 | 2.65 | 1.8052 | 25.46 |
| 4 | 59.84 | 9.40 | | |
| 5 | 98.15 | 12.00 | 1.7015 | 41.24 |
| 6 | −79.48 | 78.70 | | |

Fall = 119.71 (mm)
f1 = 229.9 (mm)
f2 = 95.16 (mm)
f3 = 64.38 (mm)
N1 = 1.5163
N2 = 1.8052
N3 = 1.7015
v1 = 64.14
v2 = 25.46
v3 = 41.24
D12 = 67.70 (mm)
D23 = 9.40 (mm)
BF = 78.70 (mm)
D23/Fall = 0.079
v2/v3 = 0.617
BF/Fall = 0.657
|f2|/|Fall| = 0.795
D12/D23 = 7.20

Comparative Example

Figure 7:
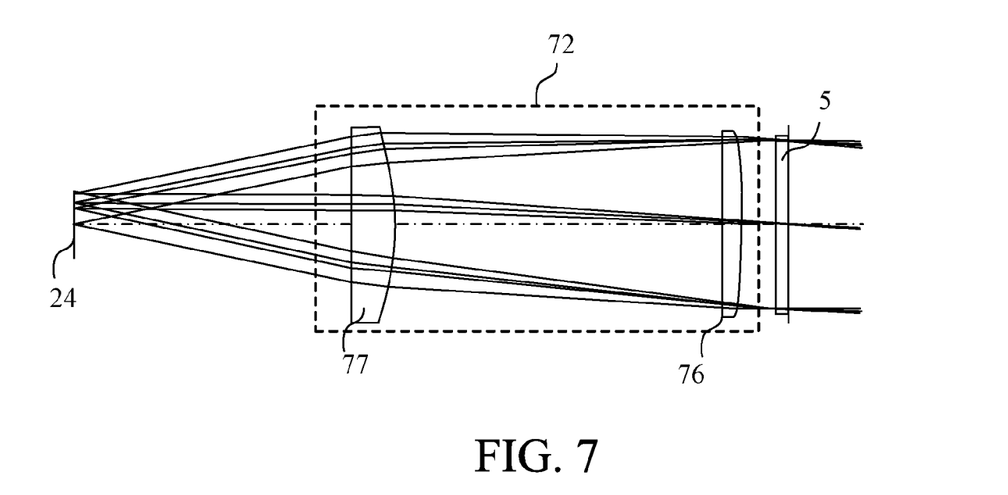
FIG. 7 is a sectional view of a condenser optical system of a conventional illumination optical system.

FIG. 7 illustrates a configuration of a second optical system 72 of an illumination optical system in a conventional liquid crystal projector as a comparative example. A first optical system (not illustrated) and a polarization conversion element 5 in the illumination optical system of this comparative example are identical to the first optical system 21 and the polarization conversion element 5 in Embodiment 1. The second optical system 72 of this comparative example includes in order from a first optical system side (polarization conversion element side), a first lens 76 having a positive power and a second lens 77 having a positive power.

Figure 3A:
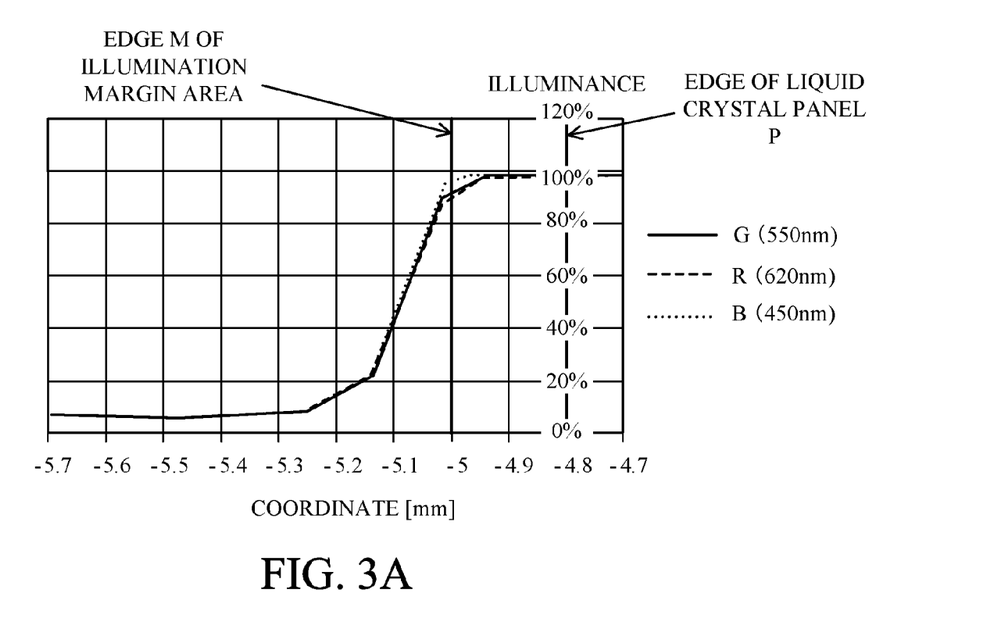
FIGS. 3A and 3B illustrate graphs showing luminance distributions on and around a liquid crystal panel in Embodiment 1 and a comparative example.
Figure 3B:
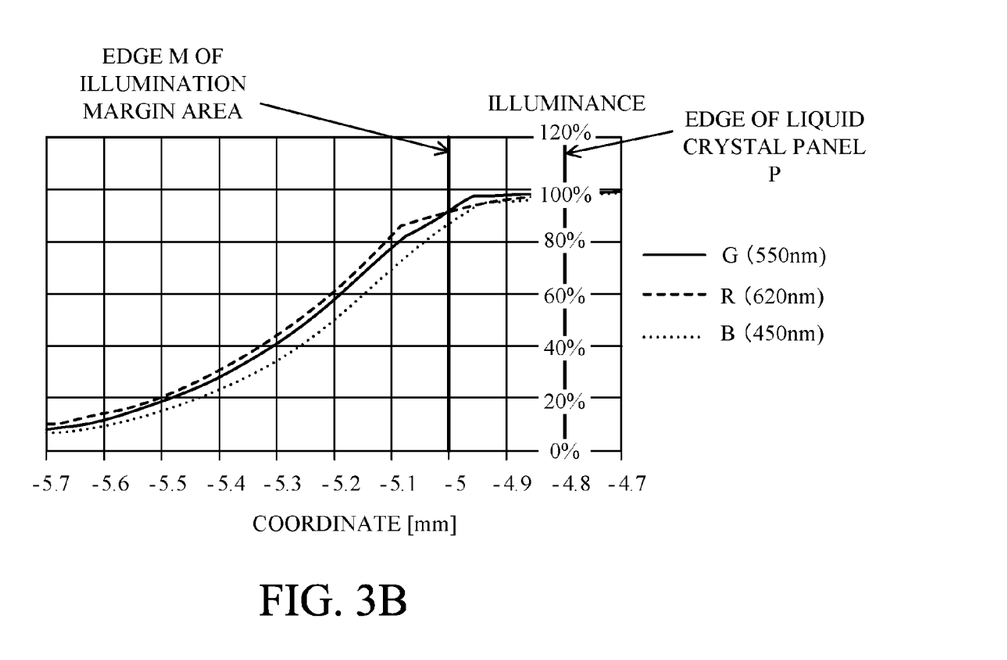

FIG. 3A illustrates an illuminance distribution on and around a liquid crystal panel in the case where the illumination optical system 23 of Embodiment 1 illuminates the liquid crystal panel. FIG. 3B illustrates an illuminance distribution on and around the liquid crystal panel in the case where the illumination optical system 23 of Embodiment 1 illuminates the liquid crystal panel. In each of these drawings, a horizontal axis shows positions (coordinates) downward (to a minus side) in a vertical direction (in which short sides of the liquid crystal panel extend) from an origin that is a center of the liquid crystal panel (that is, an optical axis position of the illumination optical system), and a vertical axis shows illuminances of R, G and B lights. Furthermore, P represents a lower edge (−4.8 mm) of the liquid crystal panel, M represents a lower edge (−5 mm) of an illumination margin area provided in an effective illumination area formed by the illumination optical system as a margin area outside the liquid crystal panel. These drawings omit a part further right than a position of −4.7 mm. A position of +4.8 mm corresponds to an upper edge of the liquid crystal panel, and a position of +5.0 mm corresponds to an upper edge of the illumination margin area.

That is, in FIGS. 3A and 3B, the illumination margin areas whose each width is 0.2 mm are provided at upper and lower outsides of the upper and lower edges of the liquid crystal panel. The upper and lower edges of the liquid crystal panel mean upper and lower edges of an effective modulation area thereof that modulates light from the illumination optical system. The illuminance is shown as a ratio (%) normalized by an illuminance at a position of 0 mm (origin) of the liquid crystal panel. Such illumination margin areas are also provided in a horizontal direction at right and left outsides of right and left edges of the liquid crystal panel. These right and left illumination margin areas have the same relation as that of the upper and lower illumination margin areas illustrated in FIGS. 3A and 3B.

The illumination margin areas illustrated in FIGS. 3A and 3B each have a sufficiently small width.

Light reaching an area further outside than the illumination margin area (that is, reaching outside the effective illumination area) is not used at all. Therefore, it is ideal that the illuminance be 0% outside the effective illumination area (that is, on a left side further than the edge M of the illumination margin area), rise at the edge M of the illumination margin area and be approximately 100% in an area further right than the edge P of the liquid crystal panel. Furthermore, it is also ideal that the R, G and B lights respectively rise up to near 100% at the edge M of the illumination margin area.

In the illumination distribution of the illumination optical system of the comparative example illustrated in FIG. 3B, an amount of light outside the effective illumination area, that is, a loss of light is large. In addition, at the edge M of the illumination margin area, the illuminance of the B light is reduced compared with those of the G and R lights.

On the other hand, in the illumination distribution of the illumination optical system of this embodiment illustrated in FIG. 3A, as compared with the illumination distribution of FIG. 3B, such a loss of light outside the effective illumination area is reduced by reducing aberration such as spherical aberration, and the illuminance reduction of the B light at the edge M of the illumination margin area is also reduced.

As described above, this embodiment enables, as compared with the comparative example, improving illumination efficiency and color reproducibility.

Embodiment 2

Figure 4:
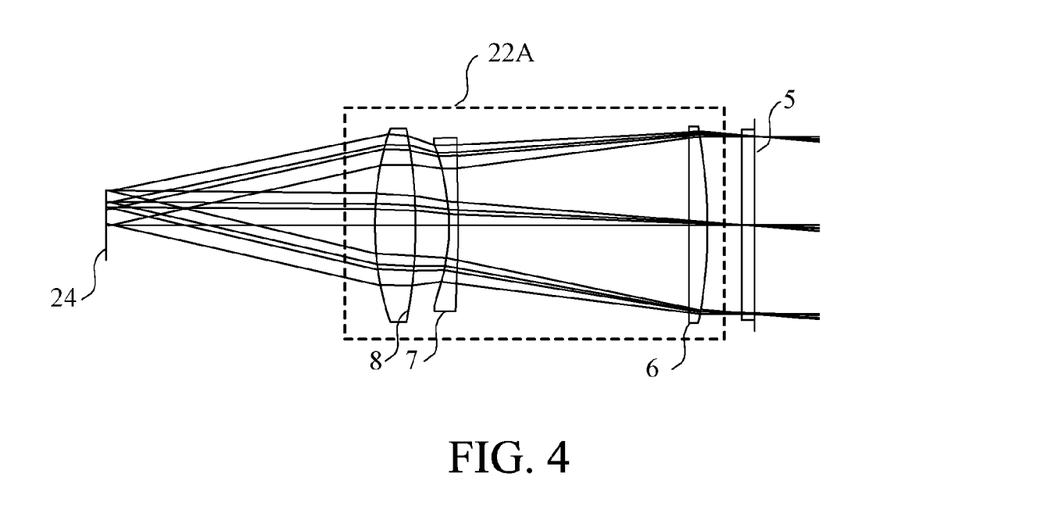
FIG. 4 is a sectional view of a condenser optical system in Embodiment 2.

FIG. 4 illustrates a configuration of a second optical system 22A of an illumination optical system in a liquid crystal projector that is a second embodiment (Embodiment 2) of the present invention. A first optical system 21 and a polarization conversion element 5 in the illumination optical system of this embodiment are identical to the first optical system 21 and the polarization conversion element 5 in Embodiment 1.

The second optical system 22A also includes, as the second optical system 22 in Embodiment 1, in order from a first optical system side (polarization conversion element side), a first lens 6 having a positive power, a second lens 7 having a negative power and a third lens 8 having a positive power. The second lens 7 is a planar-concave lens whose first optical system side lens surface is a planar surface.

Table 2 shows a numerical example of this embodiment. Numerals and symbols in Table 2 have the same meanings as those in Table 1. Below Table 2, numerical values of expressions (1) to (7) are listed.

TABLE 2

(Numerical Example 2)

| | R | D | N | ν |
|---|---|---|---|---|
| 1 | 105.60 | 5.50 | 1.5168 | 64.20 |
| 2 | ∞ | 67.70 | | |
| 3 | ∞ | 2.65 | 1.8052 | 25.46 |
| 4 | 55.15 | 9.40 | | |
| 5 | 116.52 | 12.00 | 1.8160 | 46.62 |
| 6 | −69.14 | 78.20 | | |

Fall = 119.76 (mm)
f1 = 203.8 (mm)
f2 = 67.94 (mm)
f3 = 54.52 (mm)
N1 = 1.5168
N2 = 1.8052
N3 = 1.8160
ν1 = 64.20
ν2 = 25.46
ν3 = 46.62
D12 = 67.70 (mm)
D23 = 9.40 (mm)
BF = 78.20 (mm)
D23/Fall = 0.078
ν2/ν3 = 0.546
BF/Fall = 0.653
|f2|/|Fall| = 0.567
D12/D23 = 7.20

Embodiment 3

Figure 5:
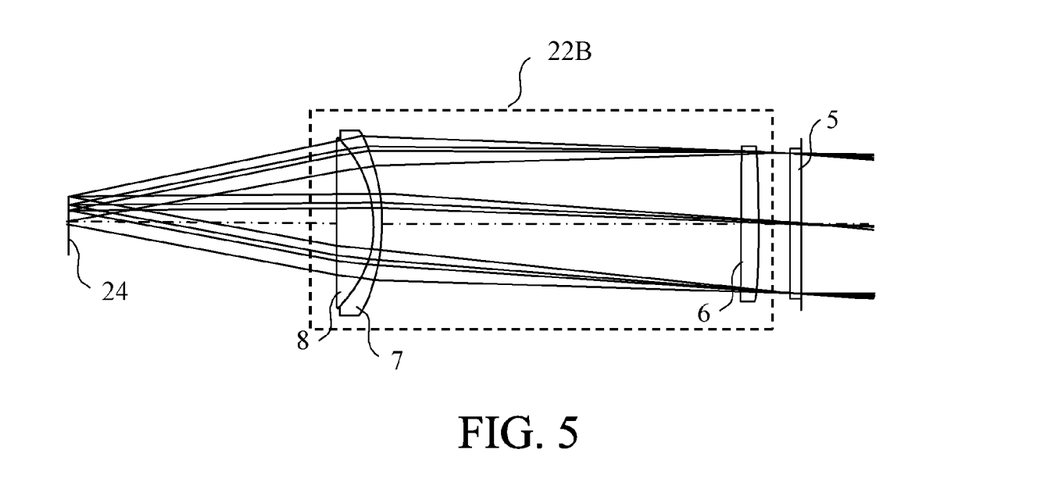
FIG. 5 is a sectional view of a condenser optical system in Embodiment 3.

FIG. 5 illustrates a configuration of a second optical system 22B of an illumination optical system in a liquid crystal projector that is a third embodiment (Embodiment 3) of the present invention. A first optical system 21 and a polarization conversion element 5 in the illumination optical system of this embodiment are identical to the first optical system 21 and the polarization conversion element 5 in Embodiment 1.

The second optical system 22B also includes, as the second optical systems 22 and 22A in Embodiments 1 and 2, in order from a first optical system side (polarization conversion element side), a first lens 6 having a positive power, a second lens 7 having a negative power and a third lens 8 having a positive power. The second lens 7 is a meniscus lens convex toward the first optical system side. The second lens 7 and the third lens 8 constitute a cemented lens.

Table 3 shows a numerical example of this embodiment. Numerals and symbols in Table 3 have the same meanings as those in Table 1. The 4th surface is a cemented surface of the second lens 7 and the third lens 8. Below Table 3, numerical values of expressions (1) to (7) are listed.

TABLE 3

| (Numerical Example 3) | | | |
|---|---|---|---|
| R | D | N | ν |
| 1 | 349.22 | 5.50 | 1.5168 | 64.20 |
| 2 | ∞ | 67.33 | | |
| 3 | 67.33 | 2.65 | 1.8052 | 25.46 |
| 4 | 39.60 | 12.00 | 1.6598 | 50.84 |
| 5 | ∞ | 88.13 | | |

Fall = 119.77 (mm)
f1 = 674.11 (mm)
f2 = 123.78 (mm)
f3 = 59.76 (mm)
N1 = 1.5168
N2 = 1.8052
N3 = 1.6598
ν1 = 64.20
ν2 = 25.46
ν3 = 50.84
D12 = 67.33 (mm)
D23 = 0.00 (mm)
BF = 88.13 (mm)
D23/Fall = 0.00
ν2/ν3 = 0.501
BF/Fall = 0.736
|f2|/|Fall| = 1.033
D12 > D23 × 5 (=0)

Embodiment 4

Figure 6:
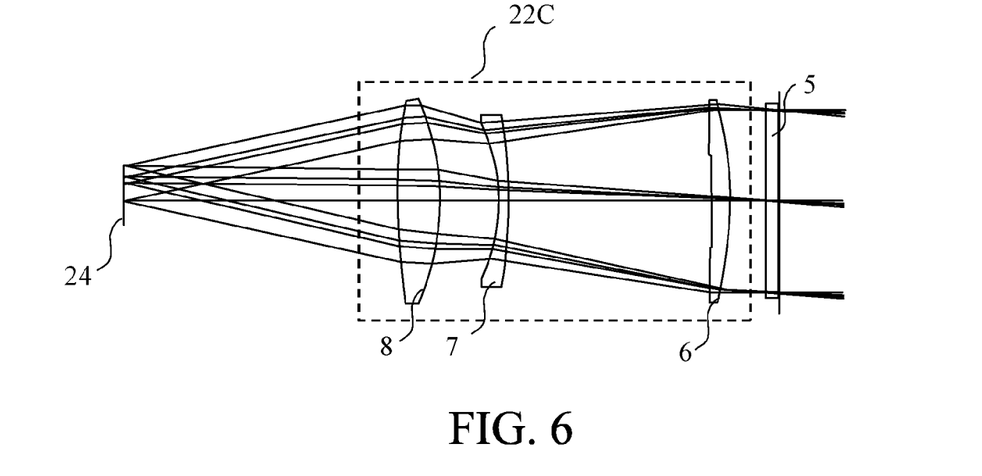
FIG. 6 is a sectional view of a condenser optical system in Embodiment 4.

FIG. 6 illustrates a configuration of a second optical system 22C of an illumination optical system in a liquid crystal projector that is a fourth embodiment (Embodiment 4) of the present invention. A first optical system 21 and a polarization conversion element 5 in the illumination optical system of this embodiment are identical to the first optical system 21 and the polarization conversion element 5 in Embodiment 1.

The second optical system 22C also includes, as the second optical system 22 in Embodiment 1, in order from a first optical system side (polarization conversion element side), a first lens 6 having a positive power, a second lens 7 having a negative power and a third lens 8 having a positive power. The second lens 7 is a meniscus lens convex toward the first optical system side.

Table 4 shows a numerical example of this embodiment. Numerals and symbols in Table 4 have the same meanings as those in Table 1. Below Table 4, numerical values of expressions (1) to (7) are listed.

TABLE 4

| (Numerical Example 4) | | | |
|---|---|---|---|
| R | D | N | ν |
| 1 | 82.35 | 5.50 | 1.5168 | 64.20 |
| 2 | 588.59 | 58.16 | | |

TABLE 4-continued

| (Numerical Example 4) | | | |
|---|---|---|---|
| R | D | N | ν |
| 3 | 116.57 | 2.65 | 1.8052 | 25.46 |
| 4 | 39.97 | 17.00 | | |
| 5 | 57.97 | 12.00 | 1.6600 | 51.00 |
| 6 | −127.53 | 78.20 | | |

Fall = 119.77 (mm)
f1 = 183.97 (mm)
f2 = 76.1 (mm)
f3 = 61.73 (mm)
N1 = 1.5168
N2 = 1.8052
N3 = 1.6600
ν1 = 64.20
ν2 = 25.46
ν3 = 51.00
D12 = 58.16 (mm)
D23 = 17.00 (mm)
BF = 78.20 (mm)
D23/Fall = 0.142
ν2/ν3 = 0.499
BF/Fall = 0.653
|f2|/|Fall| = 0.635

Each of the above-described embodiments enables reducing the illumination margin area with respect to the illumination surface and thereby enables achieving a compact illumination optical system whose light utilization efficiency is high. Furthermore, using this illumination optical system enables achieving a compact image projection apparatus capable of projecting a bright image.

Although the above embodiments described the illumination optical systems used in the liquid crystal projector, illumination optical systems having similar configurations and satisfying the conditions expressed by above expressions (1) to (7) may be used in other optical apparatuses for illuminating their illumination surfaces.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-155645, filed on Aug. 6, 2015, which is hereby incorporated by reference herein in its entirety.

What is claimed is:

1. An illumination optical system configured to illuminate an illumination surface, the illumination optical system comprising:
  a first optical system configured to cause a light flux from a light source to form a light source image; and
  a second optical system configured to introduce the light flux from the first optical system to the illumination surface,
wherein:
  the second optical system includes in order from a first optical system side;
  a first lens having a positive power;
  a second lens having a negative power; and
  a third lens having a positive power, and
  the second optical system satisfies the following conditions:

$0.20 \leq \nu 2/\nu 3 \leq 0.75$ $0.4 \leq BF/\text{Fall} < 1.0$ where ν2 represents an abbe number of the second lens, ν3 represents an abbe number of the third lens, Fall represents a focal length of the second optical system, and BF represents an air-equivalent distance from the third lens to the illumination surface.

2. An illumination optical system according to claim 1, wherein the second optical system further satisfies the following condition:

$$0.0 \leq D23/\text{Fall} \leq 0.2$$

where D23 represents an air-equivalent distance from the second lens to the third lens.

3. An illumination optical system according to claim 1, wherein the second optical system further satisfies the following condition:

$$0.5 \leq |f2|/|\text{Fall}| \leq 1.3$$

where f2 represents a focal length of the second lens.

4. An illumination optical system according to claim 1, wherein the second optical system further satisfies the following condition:

$$15 < \nu 2 < 45.$$

5. An illumination optical system according to claim 1, wherein the second optical system further satisfies the following conditions:

$$1.55 \leq N2 < 2.00$$

$$1.55 \leq N3 < 1.90$$

where N2 represents a refractive index of the second lens, and N3 represents a refractive index of the third lens.

6. An illumination optical system according to claim 1, further comprising:
a polarization conversion element disposed between the first and second optical systems and configured to convert non-polarized light from the light source into polarized light having a predetermined polarization direction; and
a polarization beam splitter disposed between the second optical system and the illumination surface and configured to introduce the polarized light to the illumination surface.

7. An illumination optical system according to claim 1, wherein an air-equivalent distance from the first lens to the second lens is longer than five times that from the second lens to the third lens.

8. An illumination optical system according to claim 1, wherein the second lens is a meniscus lens convex toward the first optical system side.

9. An image projection apparatus comprising:
an illumination optical system configured to illuminate an illumination surface; and
a light modulator disposed at the illumination surface, the apparatus configured to project light modulated by the light modulator onto a projection surface,
wherein the illumination optical system comprising:
a first optical system configured to cause a light flux from a light source to form a light source image; and
a second optical system configured to introduce the light flux from the first optical system to the illumination surface,
wherein:
the second optical system includes in order from a first optical system side;
a first lens having a positive power;
a second lens having a negative power; and
a third lens having a positive power, and
the second optical system satisfies the following conditions:

$$0.20 \leq \nu 2/\nu 3 \leq 0.75$$

$$0.4 \leq BF/\text{Fall} < 1.0$$

where ν2 represents an abbe number of the second lens, ν3 represents an abbe number of the third lens, Fall represents a focal length of the second optical system, and BF represents an air-equivalent distance from the third lens to the illumination surface.

10. An illumination optical system configured to illuminate an illumination surface, the illumination optical system comprising:
a first optical system configured to cause a light flux from a light source to form a light source image; and
a second optical system configured to introduce the light flux from the first optical system to the illumination surface,
wherein:
the second optical system includes in order from a first optical system side;
a first lens unit including lenses and having a positive power;
a second lens unit including lenses and having a negative power; and
a third lens unit including lenses and having a positive power, and
the second optical system satisfies the following conditions:

$$0.20 \leq \nu 2/\nu 3 \leq 0.75$$

$$0.4 \leq BF/\text{Fall} < 1.0$$

where ν2 represents an average abbe number of all the lenses included in the second lens unit, ν3 represents an average abbe number of all the lenses included in the third lens unit, Fall represents a focal length of the second optical system, and BF represents an air-equivalent distance from the third lens unit to the illumination surface.

11. An image projection apparatus comprising:
an illumination optical system configured to illuminate an illumination surface; and
a light modulator disposed at the illumination surface, the apparatus configured to project light modulated by the light modulator onto a projection surface,
wherein the illumination optical system comprising:
a first optical system configured to cause a light flux from a light source to form a light source image; and
a second optical system configured to introduce the light flux from the first optical system to the illumination surface,
wherein:
the second optical system includes in order from a first optical system side;
a first lens unit including lenses and having a positive power;
a second lens unit including lenses and having a negative power; and
a third lens unit including lenses and having a positive power, and
the second optical system satisfies the following conditions:

$$0.20 \leq \nu 2/\nu 3 \leq 0.75$$

$$0.4 \leq BF/\text{Fall} < 1.0$$

where ν2 represents an average abbe number of all the lenses included in the second lens unit, ν3 represents an average abbe number of all the lenses included in the third lens unit, Fall represents a focal length of the second optical system, and BF represents an air-equivalent distance from the third lens unit to the illumination surface.

* * * * *